UNITED STATES PATENT OFFICE.

MILLER EUGENE CONRAD, OF ATLANTIC, IOWA, ASSIGNOR TO CHARLES B. SCHOENMEHL, OF WATERBURY, CONNECTICUT.

VOLTAIC CELL.

1,262,020.     Specification of Letters Patent.     Patented Apr. 9, 1918.

No Drawing.     Application filed February 7, 1917.  Serial No. 147,133.

*To all whom it may concern:*

Be it known that I, MILLER EUGENE CONRAD, a citizen of the United States, and resident of Atlantic, in the county of Cass and State of Iowa, have invented certain new and useful Improvements in Voltaic Cells, of which the following is a specification.

This invention relates to voltaic cells, and especially to an improved depolarizing cell and an improved negative element therefor, whereby the useful life of a cell is prolonged and the electromotive force increased.

The accumulation of hydrogen-bubbles on the surface of the negative plate of a voltaic cell, known as "polarization", is doubly objectionable. It results in a diminution of the current, first by diminishing the exposed area of the negative plate and so increasing the internal resistance of the cell, and, second, by its tendency to set up a "polarization-current" in the direction opposite to that of the cell, the hydrogen being more positive than the zinc or other positive plate.

In the cell of my invention polarization is prevented by the conversion of the hydrogen of polarization into phosphin or phosphureted hydrogen ($H_3P$). This action is most conveniently effected by using as a negative element, phosphid of one of the metals. The nascent hydrogen coming into contact with the phosphid readily unites with phosphorous to form $H_3P$ which is immediately driven off.

In making my non-polarizing element which may be in a plate form, I have used oxids of several metals, such as antimony, lead and iron, but prefer the several oxids of iron for reasons of availability, of working very clean and giving a constant current, besides being cheap. The iron oxid mixed with a sufficient quantity of phosphorus, preferably red because of its non-poisonous qualities, is placed in a crucible and heated. The resulting phosphid would be $Fe_2OP$, $Fe_2O_2P$, or $Fe_2O_3P$. Regarding any chemical action in the cell it appears to be immaterial how many equivalents of oxygen are retained in the phosphid, as the oxygen does not seem to be separated during voltaic action.

It is more than likely that one or even two equivalents of oxygen are driven off in union with phosphorus in the form of the two oxids of phosphorus during the formation of the phosphid, so that hereinafter I write it $Fe_2OP$. These several compounds are collectively designated "oxyphosphids", by which term I mean to cover any phosphid in which phosphorus replaces any part of the oxygen.

My improved non-polarizing element may be used with advantage in connection with any of the electrolytes now in use in primary cells. The best results are obtained by the use of zinc and phosphid of iron elements and dilute $H_2SO_4$, KHO or NaHO as the electrolyte. Using $H_2SO_4$ as the electrolyte would give the equation as follows:

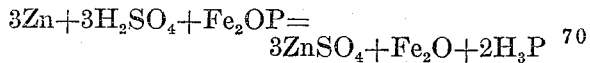

$$3Zn + 3H_2SO_4 + Fe_2OP = 3ZnSO_4 + Fe_2O + 2H_3P$$

The hydrogen in its nascent state combines at once with the phosphorus of the negative element to form $H_3P$. The cell is continually thus depolarized, so as to give a constant current. No perceptible local action exists.

A valuable feature of the invention is the fact that the phosphid element may be renewed by again treating it with phosphorus as often as its previous supply of phosphorous is exhausted without noticeable deterioration.

My invention is not limited to any or all of the applications herein described.

The depolarizing element may be in any suitable shape; such as a plate, rod, cylinder or vessel; or it may be held in any suitable container.

One of the advantages of the treatment of iron oxid with phosphorus, especially true in the case of red oxid, is that it becomes a better conductor, thus lessening the internal resistance of the cell.

The conductivity of the metallic oxids, such as copper and lead, and prepared according to my specification is also appreciatively increased over that of the corresponding oxid.

What I claim as my invention and desire to secure by Letters Patent, are the follow- ing new and novel features, substantially as set forth:

1. A negative electrode for use in a voltaic cell, composed of a metallic oxyphosphid.
2. A negative electrode for use in a voltaic cell, composed of an oxyphosphid of iron.

Signed at Atlantic in the county of Cass and State of Iowa, this 27 day of January A. D., 1917.

MILLER EUGENE CONRAD.

Witnesses:
G. T. MARSH,
JAMES R. GIFFEN.

Copies of this patent may be obtained for five cents each, by addressing the "Commissioner of Patents, Washington, D. C."